United States Patent [19]

Storm

[11] Patent Number: 5,541,915
[45] Date of Patent: Jul. 30, 1996

[54] METHOD FOR POINT-TO-MULTIPOINT CONNECTIONS IN SELF-ROUTING ATM SWITCHING NETWORKS

[75] Inventor: Juergen Storm, Puchheim, Germany

[73] Assignee: Siemens Aktiengesellschaft, Munich, Germany

[21] Appl. No.: 213,256

[22] Filed: Mar. 15, 1994

[30] Foreign Application Priority Data

Mar. 15, 1993 [DE] Germany ............................ 43 08 174.6

[51] Int. Cl.⁶ ................................................. H04L 12/56
[52] U.S. Cl. ...................... 370/60.1; 370/68.1; 370/94.3
[58] Field of Search .................................. 370/58.1, 58.2,
370/60, 60.1, 61, 110.1, 56, 54, 94.3, 68.1,
85.13, 94.2, 58.3

[56] References Cited

U.S. PATENT DOCUMENTS

| | | | |
|---|---|---|---|
| 4,491,945 | 1/1985 | Turner | 370/60 |
| 4,694,452 | 9/1987 | Beckinger et al. | 370/110.1 |
| 5,140,585 | 8/1992 | Tomikawa | 370/60.1 |
| 5,233,607 | 8/1993 | Barwig et al. | 370/60 |
| 5,265,088 | 11/1993 | Takigawa et al. | 370/60 |
| 5,287,530 | 2/1994 | Davis et al. | 370/60 |

FOREIGN PATENT DOCUMENTS 0446589  9/1991  European Pat. Off. .
93/03567  2/1993  WIPO .

OTHER PUBLICATIONS

Japanese Abstract, Unexamined applications, E Field, vol. 17, No. 101, (E–1327), JP–A–04 290 333. Mar. 1993, p. E1327.

*Primary Examiner*—Wellington Chin
*Assistant Examiner*—Chau T. Nguyen
*Attorney, Agent, or Firm*—Hill, Steadman & Simpson

[57] ABSTRACT

Point-to-multipoint connections, which are connections from one transmission/reception equipment to a plurality of transmission/reception equipment, can be accomplished by a virtual chain of connections being set up in which, preceding from the first transmission/reception equipment, message cells are sent to a group of a plurality of transmission/reception equipment, the messages are duplicated in the first transmission/reception equipment of the group of the plurality of transmission/reception equipment, and the messages are then sent through the ATM switching network to the next transmission/reception equipment of the group. This procedure is repeated in the further transmission/reception equipment until the end of the virtual chain connection is reached, the end being the last transmission/reception equipment of the group of the plurality of transmission/reception equipment.

7 Claims, 3 Drawing Sheets

5,541,915

METHOD FOR POINT-TO-MULTIPOINT CONNECTIONS IN SELF-ROUTING ATM SWITCHING NETWORKS

BACKGROUND OF THE INVENTION

1. Field of the Invention

The present invention is directed generally to a method for point-to-multipoint connections in a self-routing ATM switching network in which signalling calls and message calls are through connected according to ATM switching principles and in which a first transmission and reception equipment and a group of further transmission and reception equipment is connected to the ATM switching network through a switching network line circuit.

2. Description of the Related Art

U.S. Pat. No. 4,491,945 discloses a method for setting up virtual connections. The virtual connections are through-connected via an ATM switching network. According to the known method, a connection between an A-subscriber and a B-subscriber is set up in a signalling cell which is transmitted through the A-subscriber to the B-subscriber before the actual data is transmitted. The signalling cell contains a cell header in which a virtual channel number is stored. The destination address for the corresponding connection is stored in the information part of the signalling cell. On the basis of the destination address, a processor which belongs to the corresponding ATM switching network determines the output of the ATM switching network to be used for the connection to be set up and also determines the virtual channel number which is valid for this output. The virtual channel number is then used in the cell header during the actual data transmission of the message cells in order to initiate the data transmission in the direction of the B-subscriber through the corresponding output of the ATM switching network.

Point-to-point connections are implemented according to the foregoing described method. Point-to-point connections are those which are set up from an A-subscriber to a B-subscriber. By contrast, point-to-multipoint are those connections which are set up from an A-subscriber to a number of B-subscribers. The above described known method can not be used for point-to-multipoint connections since the addresses of a number of destination subscribers would have to be carried along in the cell for such connections.

FIG. 1 of the present application shows a possibility for using the known point-to-point method to achieve point-to-multipoint connections. A connection is set up from a first transmission/reception means GPO to a group which consists of a number of transmission/reception means GP1, GP2 and GP3. In this case, the first transmission/reception means GPO as well as the group of transmission/reception means GP1, GP2 and GP3 represent equipment of a communication system but may also represent equipment in the sense of terminal subscribers. According to the known method, a centralized server S is involved in making the connection. In this case, a connection through the ATM switching network ASN to the centralized server S is set up from the first transmission/reception means GPO. At its output, the centralized server S duplicates the message cells and in turn forwards them to the group of transmission/reception means GP1, GP2 and GP3 through the ATM switching network ASN. Problems arise with this procedure in that the input of the ATM switching network ASN that is connected to the centralized server S is highly dynamically loaded.

SUMMARY OF THE INVENTION

The present invention provides a method for point-to-multipoint connections which are through-connected in an ATM switching network without limiting the dynamics.

This and other objects and advantages of the invention are achieved by a method for point-to-multipoint connections in a self-routing ATM switching network in which a signalling cell, that has an information part containing information to be transmitted as well as a cell header containing logical connection information, is transmitted by a first transmission/reception equipment for implementing a call set up to a group of further transmission/reception equipment and, depending upon the information contained in the signalling cell, information that is characteristic of the connecting path is accepted into a first and into a second table under an address allocated to the logical connection information both in a switching network line circuit of the first transmission/reception equipment as well as in the switching network line circuits of the group of further transmission/reception equipment. The first table of the switching network line circuit which is allocated to the first transmission/reception equipment is addressed with the logical connection information that is contained in the cell header of message cells, that likewise include an information part containing information to be transmitted as well as a cell header containing logical connection information. The transmitted by the first transmission/reception equipment after the call set up. The information stored in the first table under the corresponding address and directed to the further connecting path is deposited in an additional cell header and the corresponding message cell is provided with this additional cell header. The message cell which has thus been expanded is supplied to the ATM switching network and traverses the network in the direction of the first transmission/reception equipment of the group of transmission/reception equipment depending upon the information stored in the additional cell header. Subsequently, the additional cell header is removed from the message cell.

A second table in which information about whether a point-to-point or a point-to-multipoint connection has been defined proceeding from the first transmission/reception equipment is addressed in the switching network line circuit of the first transmission/reception equipment of the group of further transmission/reception equipment with logical connection information from the cell header of the message cell. The message cell is forwarded to the first transmission/reception equipment of the group of further reception equipment and, in case a point-to-multipoint connection is specified, the message cell is duplicated. The first table of the switching network line circuit of the first transmission/reception equipment of the group of further reception equipment is addressed with the logical connection information of the cell header of the duplicated message cell. The information stored in the cell header at the respective address and the corresponding further connecting path are stored in an additional cell header and the respective message cell is provided with this additional cell header. The message cell which has been expanded in this way is supplied to the ATM switching network and traverses the network depending on the information stored in the additional cell header. The additional cell header is subsequently removed from the message cell.

The switching network line circuits of the remaining transmission/reception equipment of the group of further transmission/reception equipment is traversed in a corresponding way. The respective connection is marked as a point-to-point connection in the second table of the switching network line circuit which is allocated to the last transmission/reception equipment of the group of further transmission/reception equipment.

The creation of a virtual chain of connections in which the message cells are duplicated in the switching network line circuits of the respective transmission/reception equipment is an advantage achieved by the present invention. It is particularly advantageous that the number of connecting path information to be carried along in the cell header of the message cells also remains limited to a minimum at the end of the virtual chain. According to the method of the invention, a message cell is transmitted, first, to the respective transmission/reception equipment and, second, the duplicated message cell is forwarded via the ATM switching network to further transmission/reception equipment. The duplicated message cell is a copy of the original message cell. The message cell is duplicated again if necessary in the switching network line circuit. All information which is critical to the connecting path through the ATM switching network as well as for the type of connection is stored in a first and second ruble which are contained in each switching network line circuit. A virtual chain up to the last reception equipment thus is formed.

A further feature of the present invention provides that information about the maximum bit rate to be transmitted, about the addresses of the group of further transmission/reception equipment, as well as information about whether the connection is a point-to-point or a point-to-multipoint connection is contained in the signalling cell which is emitted from the first transmission/reception equipment before the transmission event. This provides the advantage that the first and second tables contained in the respective switching network line circuits are already written to by the signalling cell with the corresponding information relating to the connection before the transmission event.

Another feature of the invention provides that the information stored in the first table is information regarding the connecting path of the respective switching stage of the ATM switching network. This provides the advantage that the message cells to be transmitted can acquire all the information relating to the connection merely by indicating their virtual channel number in the respective tables.

It is further provided that a multiplexer is used in the respective switching network line circuits and the duplicated message cell is forwarded onto one input of the multiplexer and a further message cell relating to another connection is forwarded onto another input of the multiplexer. This provides the advantage that the appertaining transmission/reception equipment can transmit message cells itself during the reception of the message cells sent by the first transmission/reception equipment.

The present method also provides that the respective switching network line circuits are redundantly provided for transmission/reception equipment. Any malfunctioning transmission/reception equipment can thereby be replaced during operation of the apparatus.

It is further provided that a point-to-multipoint connection indication be stored in the second table of the switching network line circuit of the last transmission/reception equipment of the virtual chain and that the duplicated message cell is then transmitted back to the transmission/reception equipment. The quality of the correct data transmission can be identified by a comparison procedure according to the invention, wherein the transmission/reception equipment conducts a comparison procedure sequence in order to identify whether potential errors have occurred in the data transmission. This provides the advantage that the quality of the transmission and the through-connection events in the ATM switching network can be checked and that aging of the component parts of the ATM switching network can thereby be recognized early.

BRIEF DESCRIPTION OF THE DRAWINGS

The present invention shall be set forth in greater detail with reference to an exemplary embodiment.

DETAILED DESCRIPTION OF THE PREFERRED EMBODIMENT

Figure 1:
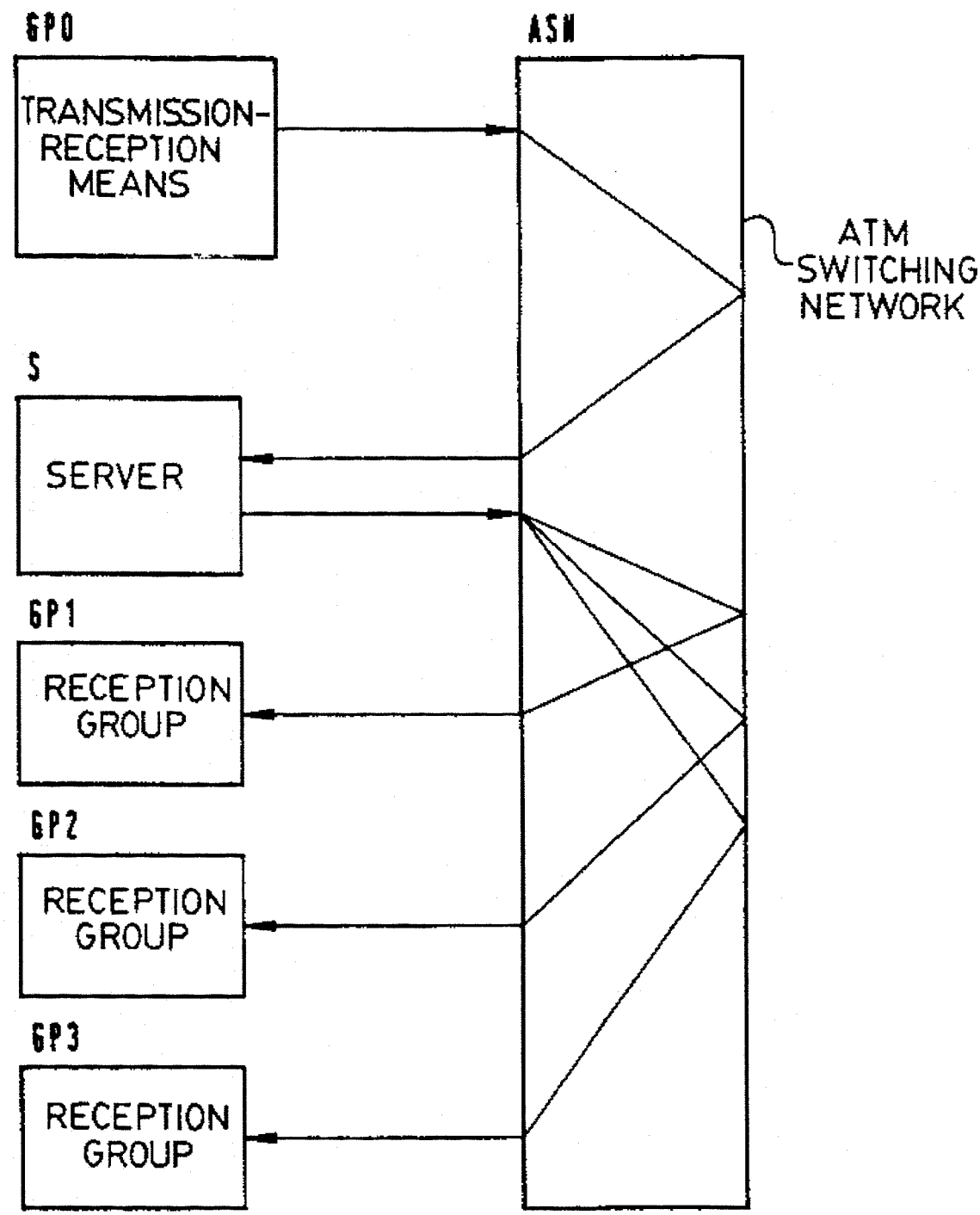
FIG. 1 is a schematic diagram of a known ATM switching system.
Figure 2:
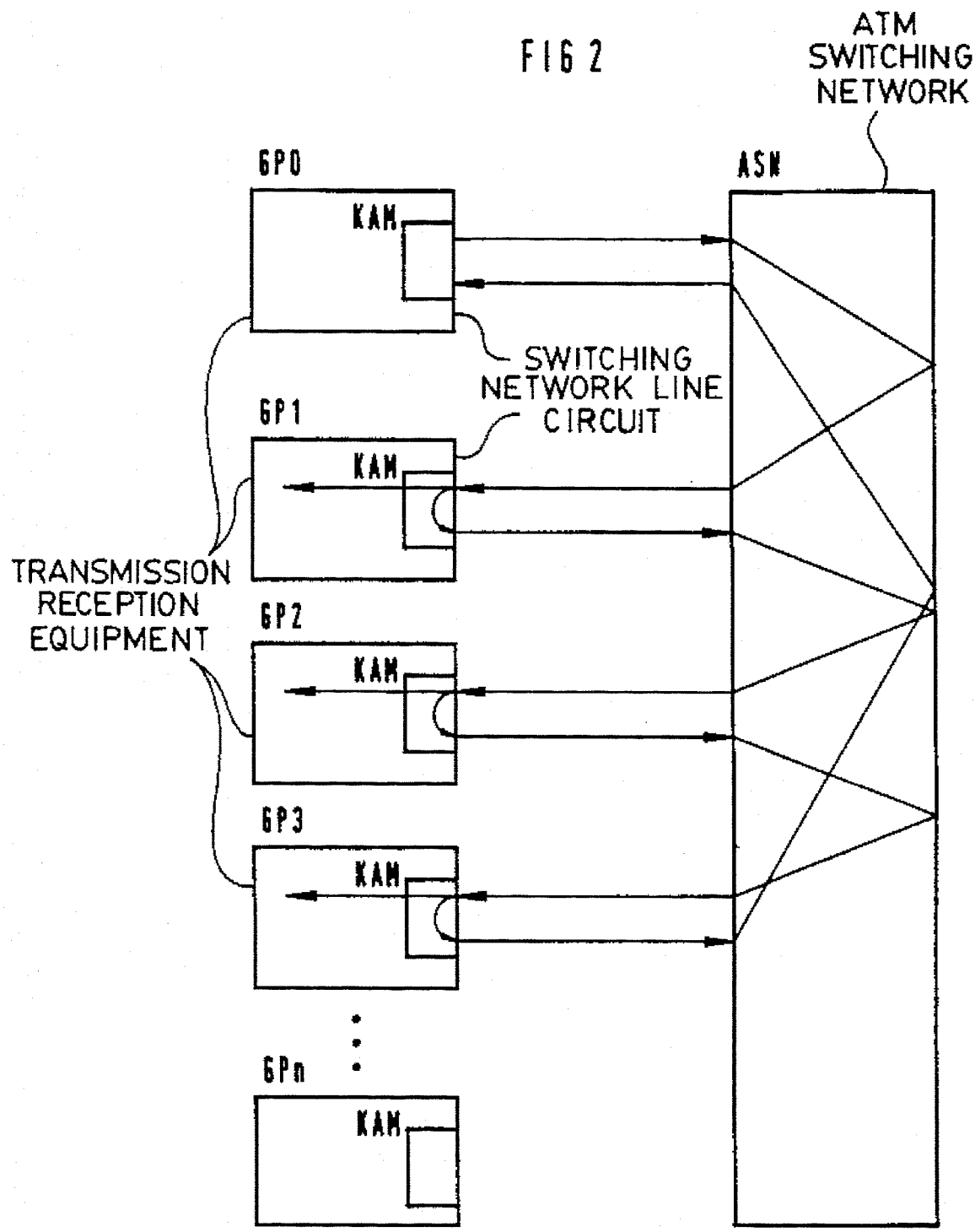
FIG. 2 is a schematic block diagram showing call set up from a transmission/reception equipment to a group consisting of a plurality of transmission/reception equipment according to the present invention.

The method of the present invention is illustrated in FIG. 2. A plurality of transmission/reception equipment GPO, GP1, GP2, GP3 . . . GPn are connected to an ATM switching network ASN. In the exemplary embodiment, a first transmission/reception equipment GPO is intended to function as the transmission equipment. This can be, for example, the central controller of a communication system. The first transmission/reception equipment GPO is to send messages to a group of three transmission/reception equipment GP1, GP2 and GP3 during the course of a virtual connection. The virtual connection is set up through the ATM switching network ASN. The switching network line circuits, which function as logically independent interface units between the transmission/reception equipment and the ATM switching network ASN, are shown in FIG. 2 in each of the transmission/reception equipment GPO through GPn as blocks KAM. It is assumed in the exemplary embodiment that a virtual connection is to be set up from the first transmission/reception equipment GPO to the group of three transmission/reception equipment GP1, GP2 and GP3.

Figure 3:
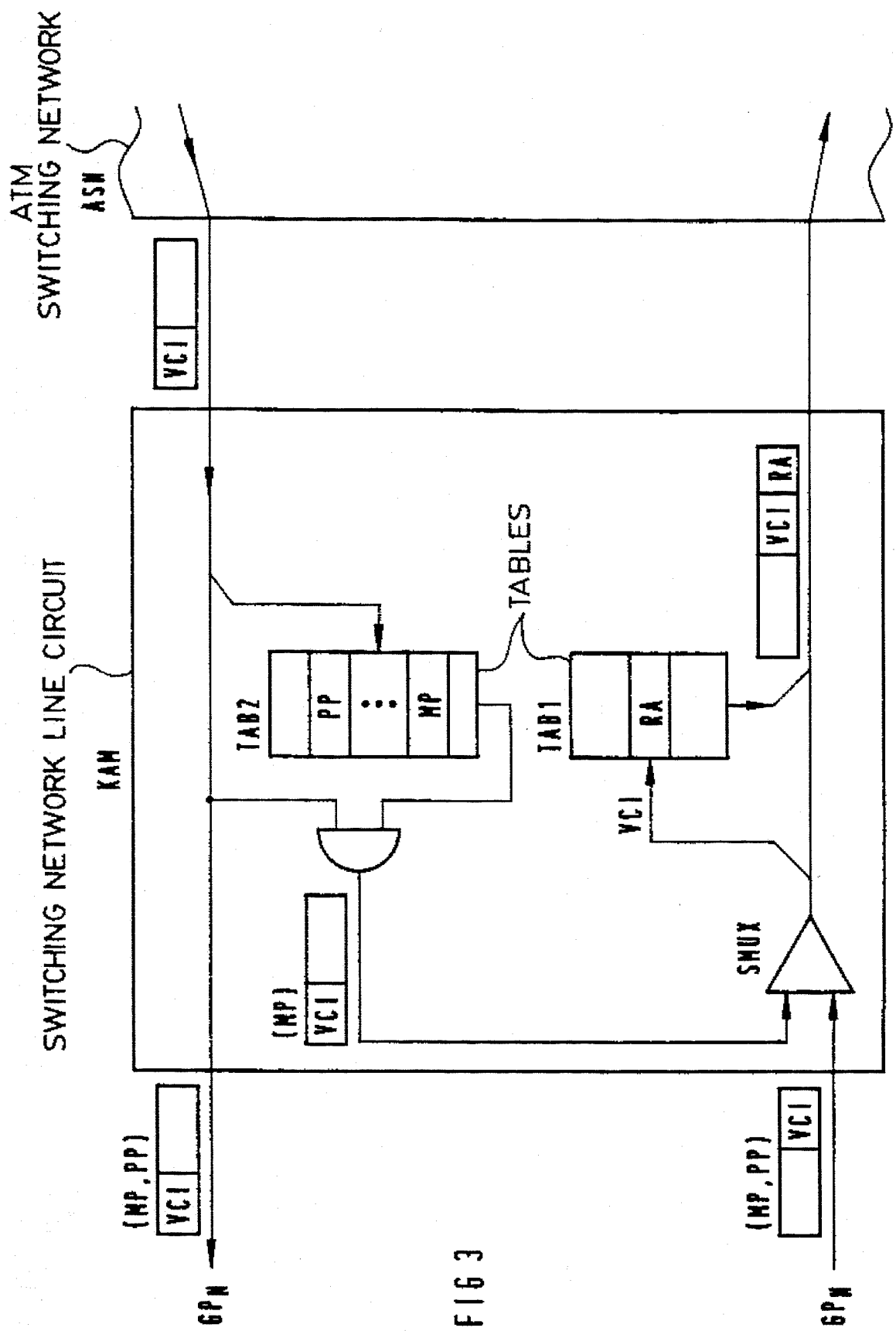
FIG. 3 is a schematic block diagram of a switching network line circuit for performing the procedures of the present invention.

FIG. 3 illustrates the conditions in the respective switching network line circuits KAM. First, signalling cells for setting up the virtual connection are transmitted from the first transmission/reception equipment GPO to each of the three transmission/reception equipment GP1, GP2 and GP3. Further information about the type of connection, in other words, whether the connection is a point-to-multipoint connection MP or whether it is a point-to-point connection PP, is contained in the information part of these signalling cells. The destination address of the corresponding transmission/reception equipment GP1, GP2 or GP3 is carried in the information cell, along with information about the maximum bit rate with which the first transmission/reception equipment GPO is to transmit the messages to be transmitted. A virtual channel number VCI is entered in the cell header of the signalling cell by the first transmission/reception equipment GPO. The virtual channel number VCI is then allocated to the corresponding connecting path within the ATM switching network ASN and is later used during the transmission of the messages in the message cells.

First and second tables TAB1 and TAB2 of the switching network line circuit KAM of the first transmission/reception equipment GPO as well as the corresponding tables of the switching network line circuits KAM of the three further transmission/reception equipment GP 1, GP2 and GP3 are updated with the information contained in the information part of the signalling cell. This means that the path which message cells belonging to the respective connection should take through the ATM switching network ASN is stored in a call-associated manner in the first table TAB1 of the switching network line circuit KAM of the transmission/ reception equipment GP0. Ultimately, the output port address of the ATM switching network ASN to which the first transmission/reception equipment GP1 of the group of transmission/reception equipment is connected through the corresponding switching network line circuit KAM, thus, is stored in the first table TAB1 of the first transmission/ reception equipment GP0. In the same way, the first table TAB1 of the first transmission/reception equipment GP1 of the group of transmission/reception equipment is written with the output port address of the ATM switching network ASN to which the second reception equipment GP2 of the group of transmission/reception equipment is connected through the corresponding switching network line circuit KAM. One likewise proceeds with the first table TAB1 of the switching network line circuit KAM of the second and third transmission/reception equipment GP2 or GP3 of the group. Further, the second table TAB2 of the switching network line circuits KAM of all three transmission/reception equipment GP1, GP2 and GP3 is written with information as to whether the respective connection is a point-to-point connection PP or whether it is a point-to-multipoint connection MP. The transmission/reception equipment GP3 is intended to be the last transmission/reception equipment in the chain to which the first transmission/reception equipment GP0 sends messages, according to the exemplary embodiment. In this case, a point-to-point connection PP is entered in the second table TAB2 of the switching network line circuit KAM of the third transmission/reception equipment GP3.

The call set-up of the virtual connection is terminated by sending out at least one acknowledgement cell from the respective transmission/reception equipment GP1 through GPn to the first transmission/reception equipment GP0. Following thereupon, the corresponding messages are sent in message cells from the first transmission/reception equipment. The actual messages are contained in the information part of the message cells, while the virtual channel number VCI is contained in the cell header. The first table TAB1 of the switching network line circuit KAM of the first transmission/reception equipment GP0 is firstly addressed with the virtual channel number. The output port address of the ATM switching network ASN from which the message cell should in turn depart from the ATM switching network ASN is stored under the respective address. The output port address precedes the cell header of the message cell has as an additional cell header RA. The message cell is then composed of the information part, of the cell header having the virtual channel number VCI, as well as of the additional cell header RA. After the message cell is transmitted from the ATM switching network ASN, the additional cell header RA is removed from the message cell.

After leaving the ATM switching network ASN, the message cell is forwarded to the switching network line circuit KAM of the transmission/reception equipment GPn, as shown in FIG. 3. Regardless of whether a point-to-point connection PP or a point-to-multipoint connection MP has been selected, the message cell is forwarded to the transmission/reception equipment GP1 with the acceptance into the switching network line circuit KAM. Simultaneously, the second table TAB2 is addressed with the virtual channel number VCI of the cell header.

In case of a point-to-point connection PP, no further actions are undertaken. In case of a point-to-multipoint connection MP, the message cell is duplicated and is sent to one of the inputs of a multiplexer SMUX. If the transmission/reception equipment GP1 is itself sending messages to other transmission/reception equipment, the respective message cells are forwarded onto the second input of the multiplexer SMUX. The respective message cells belonging to different connections are then interweaved in chronological succession at the output of the multiplexer SMUX. The first table TAB1 is then addressed with the virtual channel number VCI of the respective cell header. The information about the further through-connection path of the ATM switching network ASN found under the respective address is again placed preceding the message cell as an additional cell header RA. The duplicated message cell is then again forwarded through the output defined in the first table TAB1 to the transmission/reception equipment GP2, where the procedures set forth above are repeated.

What is referred to as a virtual chain of connections, thus, is formed based on the foregoing procedure. It is generally true that a point-to-point connection code PP is stored as the type of connection in the second table TAB2 at the end of this virtual chain. In other words, the last transmission/ reception equipment that is to be supplied with messages by the transmitting equipment is, thus, stored in the second table TAB2. This last equipment to receive the messages is the transmission/reception equipment GP3 in the exemplary embodiment.

It is provided in a further development of the invention that a point-to-multipoint connection code MP instead of a point-to-point connection code PP is stored at the end of the virtual chain, in other words, in the last transmission/ reception equipment which is the transmission/reception equipment GP3 in the exemplary embodiment. In this case, care must be taken to see that the output port address of the ATM switching network ASN to which the first transmission/reception equipment GP0 is connected is stored in the first table TAB1 of the corresponding switching network line circuit KAM. In this case, the message cells are then also duplicated in the switching network line circuit KAM of the last transmission/reception equipment and are conducted back through the ATM switching network ASN to the first transmission/reception equipment GP0. A comparison of the transmitted message cells to the message cells received on this path then occurs by comparison procedures sequencing. The quality of the through-connection can, therefore, be determined. Further, statistical data on the quality of the transmission can be retained in order to be able to report on the quality of the through-connection through the ATM switching network over longer time spans. It is thereby possible to provide early detection of the aging process of relevant component parts of the respective ATM switching network ASN.

According to a further development of the invention, the switching network line circuits KAM of the respective transmission/reception equipment GP0 through GPn are redundantly provided. In case of a malfunction, such as an outage of a switching network line circuit KAM, the malfunctioning unit can be replaced during the transmission of messages since the relevant functions can be carried out by the redundantly designed switching network line circuit KAM.

The present invention is applicable to transmission/reception equipment in a communication system in the exemplary embodiment. In general, however, other transmission/reception equipment are also possible, such as, for example, terminal subscriber equipment, and the like.

Although other modifications and changes may be suggested by those skilled in the art, it is the intention of the inventor to embody within the patent warranted hereon all changes and modifications as reasonably and properly come within the scope of his contribution to the art.

I claim:

1. Method for point-to-multipoint connections in a self-routing ATM switching network, in which signalling cells and message cells, each having an information part containing information to be transmitted and a cell header containing logical connection information, are through-connected using ATM switching, said self-routing ATM switching network comprising at least one first transmission/reception equipment and a group of further transmission/reception equipment, each of said at least one first transmission/ reception equipment and said group of further transmission/ reception equipment is respectively connected to said self-routing ATM switching network via an allocated one of switching network line circuits, comprising the steps of:

transmitting at least one of said signalling cells by said at least one first transmission/reception equipment for the implementation of a call set-up to said group of further transmission/reception equipment and, dependent on said logical connection information contained therein, storing information characteristic of a connecting path into one of a first table and information about whether a point-to-point or a point-to-multipoint connection is desired into a second table under an address allocated to said logical connection information both in said switching network line circuit of said first transmission/ reception equipment as well as in said switching network line circuits of said group of further transmission/ reception equipment;

addressing said first table of said switching network line circuit allocated to said at least one first transmission/ reception equipment with said logical connection information respectively contained in said cell header of said message cells transmitted by said first transmission/reception equipment after said call set-up, and depositing further connecting information characteristic of the connecting path stored thereat under an address addressed in said addressing step and directed to a further connecting path in an additional cell header and providing a respective one of said message cells provided therewith;

supplying said respective one of said message cells expanded in the addressing step to said self-routing ATM switching network and traversing said self-routing ATM switching network in the direction of a first transmission/reception equipment of said group of further transmission/reception equipment dependent on said further connecting information stored in said additional cell header, subsequently removing said additional cell header from said message cell;

addressing said second table, in which information about whether a point-to-point or a point-to-multipoint connection has been defined, proceeding from said first transmission/reception equipment in said switching network line circuit of said first transmission/reception equipment of said group of further transmission/reception equipment with said logical connection information of said cell header of said respective message cell;

forwarding said respective message cell to said first transmission/reception equipment of said group of further transmission/reception equipment and, in a case of said point-to-multipoint connection, additionally duplicating said respective message cell;

addressing said first table of said switching network line circuit of said first transmission/reception equipment of said group of further transmission/reception equipment with said logical connection information of said cell header of said duplicated message cell, storing said further connecting information stored thereat on the respective address and pertaining to the further connecting path in an additional cell header and providing said respective message cell therewith;

supplying said message expanded in this way to said self-routing ATM switching network and traversing said network dependent on the information stored in said additional cell header, subsequently removing said additional cell header from said message cell;

traversing said switching network line circuits of the remaining transmission/reception equipment of said group of further transmission/reception equipment in a corresponding way; and marking a connection as a point-to-point connection in said second table of said switching network line circuit which is allocated to a last transmission/reception equipment of said group of further transmission/reception equipment.

2. Method according to claim 1, further comprising a step of: providing information in said respective signalling cell proceeding from said first transmission/reception equipment with respect to at least one address of said transmission/reception equipment of said group of further transmission/reception equipment, with respect to a maximum bit rate to be transmitted, as well as with respect to a presence of a point-to-point or, respectively, point-to-multipoint connection.

3. Method according to claim 1, said method further comprising storing information in said first table of said respective switching network line circuit with respect to said connecting path in a respective switching stage of said ATM switching network.

4. Method according to claim 1, further comprising a step of:

forwarding said duplicated message cells, together with message cells potentially output by said respective transmission/reception equipment, in a direction of said ATM switching network via a multiplexer.

5. Method according to claim 1, further comprising a step of:

redundantly providing said switching network line circuits per each said transmission/reception equipment.

6. A method according claim 1, wherein said marking step is further defined by marking a point-to-multipoint connection in said second table of said switching network line circuit of said last transmission/reception equipment of said group of further transmission/reception equipment; and further comprising steps of:

depositing said address addressed in a first of said addressing steps of said first transmission/reception in said first table of a same one of said switching network line circuits; and transmitting said duplicated message cell back to said first transmission/reception equipment.

7. A method according to claim 6, further comprising a step of:

sequentially performing comparison procedures of said first transmission/reception equipment to identify the quality of said data transmission in said ATM switching network.

* * * * *